United States Patent
Seba et al.

(10) Patent No.: US 12,025,312 B2
(45) Date of Patent: Jul. 2, 2024

(54) GAS COMBUSTION ENGINE WITH COMBUSTION GAS RECUPERATION

(71) Applicant: Liebherr Machines Bulle SA, Bulle (CH)

(72) Inventors: Bouzid Seba, Riaz (CH); Michael-Alexandre Baert, Courgevaux (CH); Alix Noca, Fribourg (CH)

(73) Assignee: LIEBHERR MACHINES BULLE SA, Bulle (CH)

( * ) Notice: Subject to any disclaimer, the term of this patent is extended or adjusted under 35 U.S.C. 154(b) by 0 days.

(21) Appl. No.: 18/184,485

(22) Filed: Mar. 15, 2023

(65) Prior Publication Data
US 2023/0296053 A1  Sep. 21, 2023

(30) Foreign Application Priority Data
Mar. 15, 2022  (CH) ..................................... 278/2022

(51) Int. Cl.
F23R 3/34  (2006.01)
F02M 21/02  (2006.01)

(52) U.S. Cl.
CPC ........... F23R 3/34 (2013.01); F02M 21/0224 (2013.01); *F05D 2220/32* (2013.01); *F05D 2240/35* (2013.01)

(58) Field of Classification Search
CPC .... F23R 3/34; F05D 2220/32; F05D 2240/35; F02M 21/0224

USPC ........................................................ 123/250
See application file for complete search history.

(56) References Cited

FOREIGN PATENT DOCUMENTS

| | | |
|---|---|---|
| DE | 102010053498 A1 | 6/2012 |
| DE | 102018203210 A1 | 9/2019 |
| DE | 102018219935 A1 | 5/2020 |
| DE | 102019201905 A1 | 8/2020 |
| EP | 3741984 A1 | 11/2020 |
| EP | 4047199 A1 | 8/2022 |
| WO | 2015169684 A1 | 11/2015 |
| WO | WO-2020207712 A1 * 10/2020 ............. F02B 19/00 |

* cited by examiner

*Primary Examiner* — Mahmoud Gimie
(74) *Attorney, Agent, or Firm* — McCoy Russell LLP

(57) ABSTRACT

The invention relates to an engine having at least two combustion chambers, a shared high-pressure fuel storage tank for holding fuel gas available as pressurized gas, and means for direct injection of the fuel gas from the high-pressure fuel storage tank into the combustion chambers, wherein it is possible to provide the fuel gas in the high-pressure fuel storage tank from a primary tank, wherein it is possible to withdraw the fuel gas from the primary tank and/or to generate it from a fuel withdrawn from the primary tank along a conversion path, and a gas buffer storage tank connected to the high-pressure fuel storage tank discharges fuel gas from the high-pressure fuel storage tank into the gas buffer storage tank, and the gas buffer storage tank is further connected via a separate fuel gas path to the air intake section of the gas combustion engine.

16 Claims, 1 Drawing Sheet

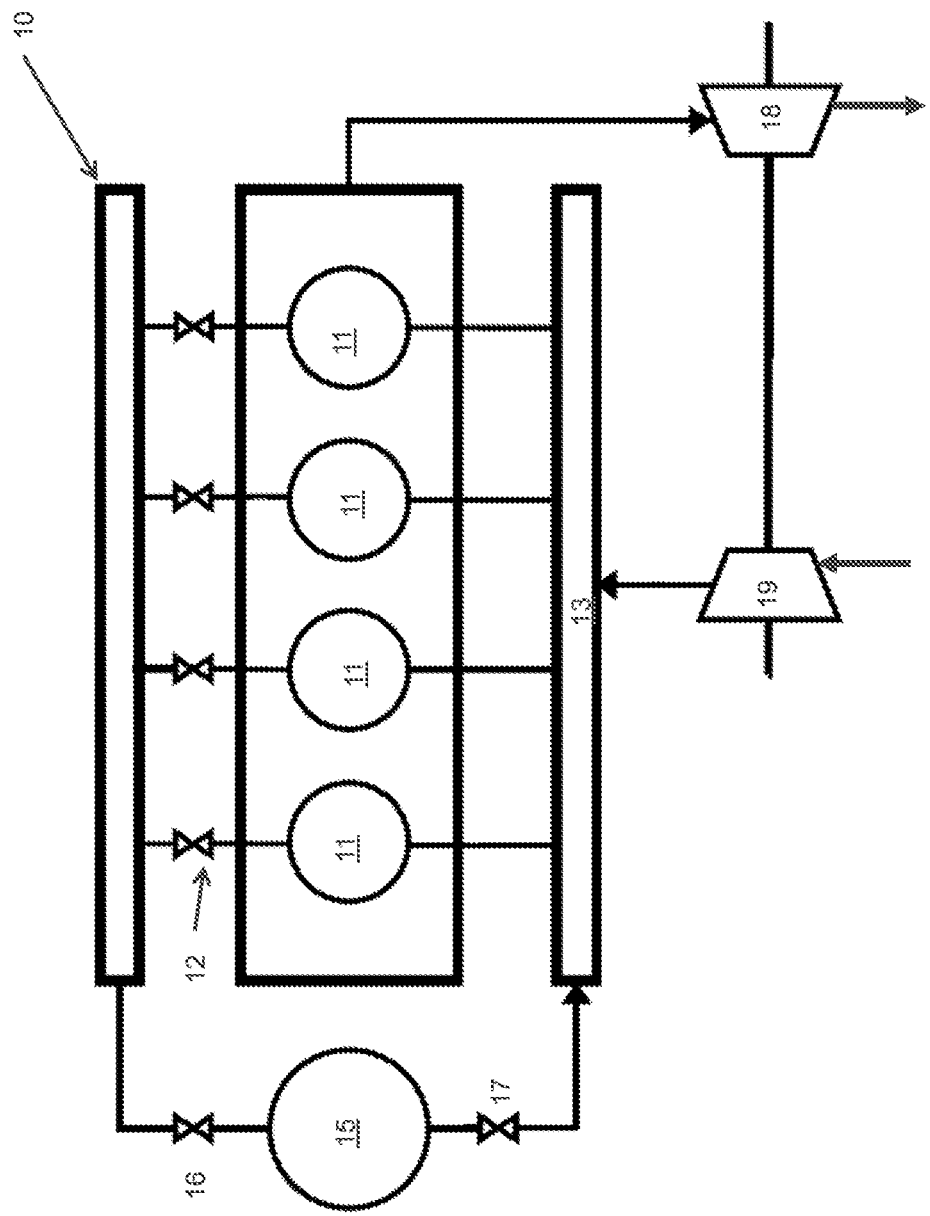

GAS COMBUSTION ENGINE WITH COMBUSTION GAS RECUPERATION

CROSS REFERENCE TO RELATED APPLICATION

The present application claims priority to Swiss Patent Application No. 000278/2022, filed Mar. 15, 2022. The entire contents of the above-listed application are hereby incorporated by reference for all purposes.

TECHNICAL FIELD

The invention relates to a gas combustion engine having at least two combustion chambers, at least one shared high-pressure fuel storage tank for holding fuel gas available as compressed gas, and means for direct injection of the fuel gas from the high-pressure fuel storage tank into the at least two combustion chambers, wherein it is possible to provide the fuel gas in the high-pressure fuel storage tank from a primary tank, wherein it is possible to withdraw the fuel gas from the primary tank and/or to generate it from a fuel withdrawn from the primary tank along a conversion path.

BACKGROUND

The pressure of the fuel gas held in the high-pressure fuel storage tank is usually referred to as the rail pressure. This pressure is adapted to the respective fuel torque consumption, which is largely determined by the current speed-torque operating point of the gas combustion engine. An increase in rail pressure shortens the necessary opening time of an injector, i.e. the opening time window until a certain amount of combustion gas has been supplied to the combustion chamber.

SUMMARY

In general, shortening the injection duration offers greater freedom and thus a wider range for optimization for defining the time window or the crankshaft angle range in which the currently intended fuel gas portion quantity of a respective fuel gas injection is to be carried out during a cylinder operating cycle. In the case of a high engine speed and simultaneous presence of a high engine output torque, i.e. a high fuel gas requirement, in conjunction with a comparatively low rail pressure, it may no longer be possible to carry out auxiliary injections. In extreme cases, the available time would not even be sufficient to supply the required quantity of fuel gas (referring to the main injection) to the relevant combustion chamber in the current operating cycle.

However, disadvantages would also exist if, when operating a gas combustion engine, a rail pressure is permanently provided which is approximately or sufficiently high to be able to cover the fuel gas requirement of the gas combustion engine in any load range. One of the numerous disadvantages that would result for such an operating mode is the consequence that in the medium and especially in the lower load range of the gas combustion engine, particularly high deviations always occur between the actually required and the actually resulting amount of combustion gas that is supplied to the respective combustion chamber during injection. The technical background to this is very simple. When the injector is fully open, the reproducibility of the volume flow passing through the injector is comparatively high. During the transitional states between opening and closing, the reproducibility of the volume flow passing through the injector is significantly poorer. Consequently—clearly within the bandwidth available for this purpose—an extension of the injector opening time has a positive effect on maintaining the fuel gas injection target quantity.

Accordingly, on the one hand short periods within which a certain quantity has been injected offer an advantage, whereas on the other hand long periods are advantageous. Consequently, there is a small individual range or even a single value of an optimum fuel gas injection duration for a specific injection quantity. This duration is used to determine a set value of the rail pressure. The more precise the latter set value is, the closer the set value of the fuel gas injection duration can be approximated to the respective optimum value. It is possible that the optimum value of the combustion gas injection period depends on the quantity of combustion gas to be supplied to the combustion chamber in the injection process in question. The period of time or the crankshaft angle range within which a certain amount of fuel gas is to be supplied to the combustion chamber in question may in turn be dependent on itself, i.e. the amount of fuel gas. It is conceivable that further conditions must be taken into account in order to actually be able to optimally determine the respective time window of a combustion gas injection.

In the case of fuels that are stored in liquid form in the main tank under normal temperature conditions, e.g. in a temperature range of −20° C. and 50° C. (such as diesel, diesel-like fuels, gasoline), the return from the high-pressure fuel storage tank to the main tank is technically comparatively simple.

However, there are also fuels for which it is not practical to return them to the main tank in mobile applications. Socio-political and natural conditions mean that fuels for which the latter is the case will now also increasingly be used. Examples of this are (i) gaseous fuels that are carried as compressed gas or liquefied gas or (ii) fuels that are only made available as such by on-board reforming. Specific examples for (i) are compressed hydrogen, CNG=Compressed Natural Gas, liquid hydrogen, LNG=Liquified Natural Gas and for (ii) ammonia.

The object of the present invention is to provide a possibility for gas combustion engines equipped with a common rail system to be able to use the fuel gas, which must be removed from the high-pressure fuel storage tank due to a required rail pressure reduction, during continued operation of the gas combustion engine, but without the need for costly reconditioning of the fuel gas.

This object is achieved by a gas combustion engine according to the features of claim 1. Advantageous embodiments of the gas combustion engine are the subject-matter of the dependent claims.

According to the invention, it is proposed that the gas combustion engine be extended by at least one additional gas buffer storage tank connected to the high-pressure fuel storage tank. Fuel gas, in particular excess fuel gas in the high-pressure fuel storage tank, is to be discharged into this gas buffer storage tank in order to achieve an intended pressure reduction in the high-pressure fuel storage tank. Unlike in conventional internal combustion engines with a common rail system, excess fuel or excess fuel gas from the high-pressure fuel storage tank is thus not fed back into the primary tank, but instead temporarily stored in the additional gas buffer storage tank. It is further proposed in accordance with the invention that the gas buffer storage tank is connected via a separate fuel gas path to the air intake section of the gas combustion engine for fuel gas supply there. Accordingly, it is possible to keep the fuel gas buffered in the gas buffer storage tank ready for regular engine operation. This creates an additional possibility for alternative or supplementary fuel gas supply to the existing direct injection system, namely via the air intake section.

This measure makes it possible to dispense with a correspondingly complex reconditioning of the fuel gas, as no recirculation to the primary tank is envisaged in the first place. The fuel gas discharged from the high-pressure fuel storage tank for the purpose of pressure reduction can nevertheless be recuperated and used by the gas combustion engine. The invention proves to be particularly useful if hydrogen is used as the fuel gas, or if a fuel or energy carrier is carried in the primary tank that is converted to hydrogen along its supply path.

In the description of the invention, in analogy with the choice of terms, the fuel in its prepared form that can be used by the gas combustion engine for combustion, i.e. at the end of a possible fuel conversion path, is referred to as fuel gas. For the purpose of achieving clarity, the end of this possible conversion path is defined as the entry of the fuel into the high-pressure fuel storage tank. Within the high-pressure fuel storage tank and downstream thereof, the term fuel gas is therefore used instead of fuel. In the primary tank, the fuel may be stored, for example, as a liquefied gas or in a chemical bond that is different from the chemical bond of the fuel gas. The type of primary tank and the supply path to the high-pressure fuel storage unit emanating therefrom are not the focus of the present invention.

The fuel gas stored in the gas buffer storage tank can be fed in a controlled manner into the air path of the gas combustion engine via the separate fuel gas path. With reference to the main direction of air flow, the location of this supply can be upstream or downstream of a branching of the air path system. In the former case, this is referred to as (single-point) injection, and otherwise as multi-point injection, wherein in the latter type, on the one hand, there is the possibility of one feed location serving to supply several combustion chambers or, on the other hand, there is a dedicated feed for each combustion chamber.

To achieve direct injection, the combustion gas is first fed to a high-pressure fuel storage tank to keep it at a set pressure level. From there, it passes via a respective injector into the functionally assigned combustion chamber. It is also conceivable to implement the invention in a gas combustion engine which, in addition to direct injection, has pre-chambers. In the case of active pre-chambers, these and the respective functionally associated combustion chamber, the latter referred to here for clarification as the main combustion chamber, can be supplied with the fuel gas from a high-pressure fuel storage tank via separate or branching combustion gas paths. As a matter of fact, separate high-pressure fuel storage tanks could also be provided for the two fuel gas supplies. With regard to such a gas combustion engine, which has a combustion gas path in which the injector outlet is located inside the pre-chamber via which a direct combustion gas supply to the pre-chamber is provided, this combustion gas path can be implemented in such a way that an indirect combustion gas supply to the main combustion chamber extending through the pre-chamber and the overflow ducts is also possible via this path. In this case, such an embodiment is preferred in which—apart from the possible fuel gas path extending via the gas buffer storage tank and suction inlet—there is only a single fuel gas path between the high-pressure fuel storage tank and the main combustion chamber, this single path then clearly first opening into the pre-chamber and then continuing via the at least one overflow duct. This in turn means that that part of the fuel gas path extending from the high-pressure fuel storage tank via the pre-chamber must be configured to allow a significantly larger fuel gas volume flow than would be necessary for such a path, which can only handle such a fuel gas supply that is sufficient for merely fulfilling the pre-chamber function.

A valve can be integrated along the fuel gas path connecting the gas buffer storage tank and the high-pressure fuel storage tank in order to regulate the fuel gas flow between the two storage tanks. It is conceivable to use such a valve, for example, in the embodiment of a proportional valve, which enables the volume or mass flow to be specified. Likewise, a valve can be integrated along the fuel gas path emanating from the gas buffer storage tank for introducing the fuel gas into the air intake section of the gas combustion engine. This valve can also act as an actuator for adjusting or controlling the volume or mass flow between the gas buffer storage tank and the air intake section. It is advantageous if the volume flow can be varied in a defined manner by the valve arranged between the high-pressure fuel storage tank and the gas buffer storage tank independently of the respective existing pressure difference of the combustion gas quantities enclosed within these two storage tanks, although there are clearly limits in this respect. For example, the bandwidth of variability is clearly reduced when the said pressure difference is reduced. The same applies preferably or alternatively to the valve arranged between the gas buffer storage tank and the air intake section and the corresponding fuel gas volume flow.

According to an optional embodiment, it can also be provided that at least one compressor is integrated along the fuel gas path via which the high-pressure fuel storage tank and the gas buffer storage tank are connected. Via the interposed compressor, the fuel gas present in the gas buffer storage tank can be withdrawn and fed back in compressed form to the high-pressure fuel storage tank. Such recirculation is particularly advantageous, for example, if a fuel gas supply from the primary tank to the high-pressure fuel storage tank is no longer possible or is no longer possible to a sufficient extent. The possibility of such a recirculation is an important basis for the realization of an emergency or reserve operation.

In a preferred embodiment, the gas buffer storage tank can be supplied with fuel gas only via the high-pressure fuel storage tank. Alternatively, however, the gas buffer storage tank can also be charged via a separate fluid path, for example from the primary tank of the overall system, which can be a mobile machine, for example.

In a preferred embodiment, a control unit is provided which is configured to regulate certain fuel gas inflows; e.g., the fuel gas volume or mass flow originating from the high-pressure fuel storage tank and opening into the gas buffer storage tank. In particular, control of the valve arranged along the fuel gas path between the high-pressure fuel storage tank and the gas buffer storage tank takes place as a function of whether the actual pressure in the high-pressure fuel storage tank is greater than the relevant set pressure or whether there is a match between these values. However, a fuel gas inflow from the high-pressure fuel storage tank to the gas buffer storage tank can also be provided if the actual pressure in the high-pressure fuel storage tank has a lower value than the relevant set value but exceeds a defined threshold value, which in turn is dimensioned to be smaller than the relevant set value.

Furthermore, the control unit can be configured in such a way that the valve arranged along the fuel gas path between the high-pressure fuel storage tank and the gas buffer storage tank can only be opened if the pressure in the high-pressure fuel storage tank is higher than in the gas buffer storage tank.

The control unit can also be used to adjust the valve fluidically located between the gas buffer storage tank and the air intake section, which is used to set the volume/mass flow originating from the gas buffer storage tank and reaching the air intake section. It is conceivable, for example, that the valve should/could only be opened when the pressure in the gas buffer storage tank is higher than the pressure in the air intake section. Furthermore, the valve arranged fluidically between the gas buffer storage tank and the intake section can be controlled as a function of the actual pressure in the high-pressure fuel storage tank. Preferably, in this case there is an internal pressure monitoring system for the high-pressure fuel storage tank, which forms a prerequisite for a release to open that valve only if the actual pressure inside the high-pressure fuel storage tank is less than or equal to its respective set value. Particularly preferably, the actual pressure must fall below the corresponding set value for the high-pressure fuel storage tank by a defined threshold value.

Such a threshold value can, for example, be defined dynamically and be set depending on the current operating state of the gas combustion engine. It is conceivable, for example, to define the threshold value as a function of the actual pressure in the gas buffer storage tank and/or a differential amount between the actual and set pressure in the high-pressure fuel storage tank.

The control unit can also be configured to regulate the injection quantity into the air intake section to a set value determined as a function of the load torque, e.g. a mathematically determined torque demanded by the gas combustion engine, and/or as a function of the fill level of the gas buffer storage tank. Provided that there is sufficient fuel gas available in the gas buffer storage tank, additional fuel gas can be injected into the air intake section during control as a function of the load torque if the set power of the gas combustion engine cannot be achieved by direct injection alone. It is also possible to influence the amount of fuel gas injected into the air intake section as a function of the gas pressure within the gas buffer storage tank. Here, it is to be taken into account that a discharge of fuel gas from the high-pressure fuel storage tank into the gas buffer storage tank is only possible if the internal pressure existing in the gas buffer storage tank does not exceed a certain threshold value. In order to avoid reaching this threshold value, fuel gas is already supplied to the air intake section from a certain proximity to this threshold value, even if the momentary fuel gas consumption is lower, in order to keep a certain quantity free in the gas buffer storage tank so that excess fuel gas from the high-pressure fuel storage tank, which is produced in the event of a corresponding reduction in the set value of the rail pressure, can be taken up in the gas buffer storage tank.

In addition to the gas combustion engine according to the invention, the present invention relates to a working machine, in particular a mobile working machine, which is operated with a gas combustion engine according to the invention, wherein the gas combustion engine of the working machine is preferably used as a drive motor for carrying out travel movements and for actuating working tools. For the application example of an excavator, these tools would be the two chain drives, the rotation of the upper carriage and the lifting and lowering movements of the boom, the arm and the bucket.

Further advantages and features of the invention will be explained in more detail below with reference to an example of an embodiment shown in the single figure. The single figure shows the schematic structure of a gas combustion engine according to the invention.

BRIEF DESCRIPTION OF THE FIGURES

The figure shows a schematic diagram of a gas combustion engine according to the invention, using the example of a single-stage supercharged 4-cylinder internal combustion engine. A gas combustion engine according to the invention can be equipped with a common rail system. For the sake of simplicity, only the high-pressure fuel storage tank 10 shared by the four combustion chambers 11 and the four injectors 12 symbolized as valve symbols are shown, while the fuel supply path from the primary tank into the high-pressure fuel storage tank 10 is not. As mentioned above, the supply path is not the focus of the invention. Combustion air is provided to the combustion chambers 11 via the common air manifold 13. The turbine 18 driven by means of the exhaust path drives the compressor 19, which compresses the intake air and supplies it to the air manifold 13.

In contrast with a previously known gas combustion engine, there is a fuel gas path between the high-pressure fuel storage tank 10 and the air manifold 13, which is routed via an gas buffer storage tank 15 and via two valves 16, 17. The combustion gas path between the high-pressure fuel storage tank 10 and the gas buffer storage tank 15 can be opened or closed via the valve 16. Similarly, the fuel gas path between the gas buffer storage tank 15 and the air manifold 13 can be opened or closed by means of the valve 17. With respect to this extension, it is only provided that fuel gas coming from the high-pressure fuel storage tank 10 flows into the gas buffer storage tank 15 and fuel gas coming from the gas buffer storage tank 15 flows into the air manifold 13.

DETAILED DESCRIPTION

In one possible embodiment of the invention, three operating states are provided for the gas buffer storage tank 15:

Operating state 1: Supplying fuel gas into the gas buffer storage tank 15.

The valve 16 may or can be opened if the rail pressure is higher than the pressure inside the gas buffer storage tank 15. Opening of the valve 16 is provided when a lowering of the rail pressure is intended. Supplementarily, it may be provided that opening of the valve 16 is also possible when the actual value of the rail pressure has reached its set value or when the rail pressure actual value has exceeded a certain threshold value below the set value. In an advantageous embodiment, if the actual value of the rail pressure is below the set value but still above a corresponding threshold value, opening of the valve 16 is only possible if a further criterion is met. This can be a criterion which in turn results from a combination of several individual criteria. Such a link can, for example, be based on a Boolean algebra up to a complex criterion which, for example, includes a load prediction.

Operating state 2: Withdrawal of fuel gas from the gas buffer storage tank 15.

A basic prerequisite for opening the valve 17 is that the pressure inside the gas buffer storage tank 15 is higher than the pressure in the air manifold 13. In a possible embodiment of the invention, it is provided that in the event of a target output of the gas combustion engine which cannot (currently) be covered by drawing fuel gas solely via direct injection by means of the injectors 12, an additional supply of fuel gas can be made from the gas buffer storage tank 15.

In a further embodiment, it can be provided that opening of the valve 17 can only take place when the actual value of the rail pressure has fallen below its set value by a certain threshold value. In an advantageous embodiment, this is not a constant threshold value. In this case, the threshold value can be dependent on the actual pressure in the gas buffer storage tank 15. Supplementarily or alternatively, the threshold value can be dependent on the deviation between the actual value and the set value of the rail pressure. In a particularly advantageous embodiment, further actual parameters can have an effect on the respective threshold value. Alternatively or in addition to continuous actual parameters and/or deviations between actual and set values, at least one further criterion can be added which has an influence on the utilization of fuel gas contained in the gas buffer storage tank 15, wherein it can be such a criterion which in turn results from a linkage of several individual criteria. Such a combination can, for example, be based on a Boolean algebra up to a complex criterion which, for example, includes a load prediction.

In operating state 3, fuel gas is neither withdrawn from nor supplied to the gas buffer storage tank 15.

In all embodiments or all further embodiments of the invention, it is provided that fuel gas which has to be removed from the high-pressure fuel storage tank 10 due to a rail pressure reduction to be carried out is preferably supplied to the gas buffer storage tank 15 by opening the valve 16.

In an advantageous embodiment, when a certain fuel gas pressure level is reached or exceeded in the gas buffer storage tank 15, a certain quantity is withdrawn from the latter in order to supply it to the gas combustion engine via the intake manifold 13 until a certain fuel gas pressure level is reached or not reached. While part of the fuel gas is supplied via the intake manifold 13, the quantity of fuel gas supplied to the gas combustion engine via direct injection is reduced accordingly.

Preferably, the valve 16 is configured in such a way that its flow behavior can be influenced by means of a corresponding control so that different volume flows can be set if a certain pressure difference exists between the fuel gas supply within the high-pressure fuel storage tank 10 and within the gas buffer storage tank 15—regardless of the value of this difference. In one possible embodiment, the valve is a proportional valve. Preferably, the system according to the invention comprises an open-loop or closed-loop control which specifies or at least significantly influences the setting of the flow behavior of the valve 16. The same applies to the valve 17 and equally to the combination of valves 16, 17. Clearly, the valves 16 and 17 can be adjusted independently of each other.

A possible further embodiment of the invention provides for the supply of fuel gas into the gas buffer storage tank 15 not only when excess fuel gas has to be removed from the high-pressure fuel storage tank 10. In a first embodiment, a fuel supply to the gas buffer storage tank 15 that is possible in this operating case may extend through the high-pressure fuel storage tank 10. In this embodiment, the fluid connection between the high-pressure fuel storage tank 10 and the gas buffer storage tank 15 is preferably configured in such a way that a controllable valve 16 is used so that it is possible to exert an influence via the prioritization of the fuel distribution (see below). In a second embodiment, a fuel supply to the gas buffer storage tank 15 that is possible in this operating case can extend via a separate fuel gas path that does not run through the high-pressure fuel storage tank 10 (not shown). This embodiment provides the advantage that it is possible to feed fuel gas into the gas buffer storage tank 15, which has no direct influence on the rail pressure.

Such further development makes it possible to exploit those advantages which may arise due to the possibility of supplying combustion gas to the gas combustion engine via the air manifold 13, alternatively or additively to a combustion gas supply via direct injection.

The advantage of the invention occurs in particular in such a fuel application, in which that fuel gas is kept available under an increased pressure in a high-pressure fuel storage tank 10, wherein the set value and correspondingly the actual value of the fuel gas located in this high-pressure fuel storage tank 10 changes to such an extent that, in the case of a necessary pressure reduction, the fuel gas must be discharged from the high-pressure fuel storage tank 10 to such an extent that it is not possible to use it regularly as fuel in the course of the pressure reduction. Preferably, the invention is used for gas combustion engines which are operated with such a fuel which can no longer be returned to the primary tank at all or could only be returned to the primary tank at considerable expense. This applies in particular to hydrogen engines.

The device according to the invention not only enables reuse of that excess fuel gas in its fuel function, but also offers added value depending on the type of primary fuel storage:

Thus, in the case of a quasi-transient increase in fuel gas demand, the previously excess fuel gas can be provided additively to the fuel gas obtainable via the regular fuel gas supply path. In the case of a gaseous fuel and a dynamically changing fuel demand, this offers a high added value, especially if the provision of fuel gas from the carried fuel requires such conditioning that a certain time lag is required from the withdrawal of the fuel from the primary storage until the presence of the fuel gas, which can be supplied to the high-pressure fuel storage by means of compression. An example of this would be the carrying of liquid organic hydrogen carriers from which hydrogen is released via a reformation process.

Using such a fuel, which first has to be conditioned—e.g. by a reformation or a preheating—the fuel gas supply of the application for the starting of the gas combustion engine and for a certain period of time immediately following this can first be made from that supply which has been built up from the previously excess fuel gas and is still available. Clearly, the functionality that enables the immediate drawing of fuel upon system activation, although immediately after the corresponding system activation the drawing of serviceable fuel from the primary storage is not possible, can be achieved otherwise than by the device according to the invention. However, in this regard, it must be emphasized that the invention already provides that advantage without any additional efforts in terms of hardware.

Due to the above-mentioned possibility of substituting fuel gas supply, limited further operation of the internal combustion engine is possible if fuel gas supply via the high-pressure path is no longer possible.

LIST OF REFERENCE CHARACTERS

High-pressure fuel storage tank 10
Combustion chamber 11
Injector for direct injection 12
Air manifold 13
Gas buffer storage tank 15
Valves 16, 17
Turbine 18
Compressor 19

The invention claimed is:

1. Gas combustion engine having at least two combustion chambers, at least one shared high-pressure fuel storage tank for holding fuel gas available as compressed gas, and injectors for direct injection of the fuel gas from the high-pressure fuel storage tank into the at least two combustion chambers, wherein a primary tank provides the fuel gas to the high-pressure fuel storage tank, and wherein the high-pressure fuel storage tank withdraws the fuel gas from the primary tank along a conversion path, wherein at least one gas buffer storage tank connected to the high-pressure fuel storage tank is provided in order to discharge fuel gas from the high-pressure fuel storage tank into the gas buffer storage tank for the purpose of lowering the pressure in the high-pressure fuel storage tank, and the gas buffer storage tank is furthermore connected via a separate fuel gas path to the air intake section of the gas combustion engine, via which fuel gas can be supplied from the gas buffer storage tank into the air intake section, and a control unit configured to control an injection quantity into the intake section as a function of a requested load torque of the engine and/or as a function of the filling level of the gas buffer storage tank.

2. Gas combustion engine according to claim 1, wherein fuel gas can be injected into an active pre-chamber by means of the high-pressure fuel storage tank.

3. Gas combustion engine according to claim 2, wherein the entire combustion gas quantity for direct injection can be supplied to a combustion chamber by means of a combustion gas path extending through the active pre-chamber.

4. Gas combustion engine according to claim 1, wherein the gas buffer storage tank is connected in each case via at least one valve to the high-pressure fuel storage tank and to the intake section of the gas combustion engine.

5. Gas combustion engine according to claim 4, wherein the volume or mass flow is adjustable by the valve arranged between the high-pressure fuel storage tank and the gas buffer storage tank and/or by the valve arranged between the gas buffer storage tank and the intake section.

6. Gas combustion engine according to claim 1, wherein the gas buffer storage tank is connected to the high-pressure fuel storage tank via at least one compressor, in order to return the fuel gas available in the gas buffer storage tank in compressed form to the high-pressure fuel storage tank.

7. Gas combustion engine according to claim 1, wherein the gas buffer storage tank can be filled with fuel gas, including from a primary tank, via a separate fuel gas path which is not routed via the high-pressure fuel storage tank.

8. Gas combustion engine according to claim 4, wherein a control unit is provided, which is configured to regulate the fuel gas mass flow or fuel gas volume flow from the high-pressure fuel storage tank to the gas buffer storage tank as a function of the pressure within the high-pressure fuel storage tank, including as a function of whether the actual pressure in the high-pressure fuel storage tank is greater than or equal to the set pressure or greater than a defined threshold value which is dimensioned smaller than the set pressure.

9. Gas combustion engine according to claim 8, wherein the control unit is further configured to allow opening of the valve between the high-pressure fuel storage tank and the gas buffer storage tank only when the pressure in the gas buffer storage tank is lower than the pressure in the high-pressure fuel storage tank.

10. Gas combustion engine according to claim 8, wherein the control unit is further configured to permit opening of the valve fluidically arranged between the gas buffer storage tank and the intake section only if the pressure in the gas buffer storage tank is higher than the pressure in the intake section and/or the actual pressure in the high-pressure fuel storage tank is lower than or equal to the set pressure of the high-pressure fuel storage tank.

11. Gas combustion engine according to claim 3, wherein the combustion gas can be introduced from the gas buffer storage tank via the separate combustion gas path into a section of the air intake section of the gas combustion engine which section is part of the air supply path of a plurality of combustion chambers, including part of the air supply path of all combustion chambers which functionally have a common air manifold.

12. Gas combustion engine according to claim 11, wherein the fuel gas can be supplied from the gas buffer storage tank via the separate fuel gas path into the section of the air intake section of the gas combustion engine that corresponds to the air manifold.

13. Gas combustion engine according to claim 1, wherein the fuel gas can be supplied from the gas buffer storage tank via the separate fuel gas path into a subsection of the air intake section which section serves for the air supply of a single combustion chamber in a dedicated manner.

14. Gas combustion engine according to claim 1, wherein the fuel gas is molecular hydrogen or a fuel gas mixture predominantly containing molecular hydrogen.

15. Mobile machine, with at least one gas combustion engine according to claim 1.

16. Gas combustion engine having at least two combustion chambers, at least one shared high-pressure fuel storage tank for holding fuel gas available as compressed gas, and injectors for direct injection of the fuel gas from the high-pressure fuel storage tank into the at least two combustion chambers, wherein a primary tank provides the fuel gas to the high-pressure fuel storage tank, and wherein the high-pressure fuel storage tank withdraws the fuel gas from the primary tank along a conversion path, wherein at least one gas buffer storage tank connected to the high-pressure fuel storage tank is provided in order to discharge fuel gas from the high-pressure fuel storage tank into the gas buffer storage tank for the purpose of lowering the pressure in the high-pressure fuel storage tank, and the gas buffer storage tank is furthermore connected via a separate fuel gas path to the air intake section of the gas combustion engine, via which fuel gas can be supplied from the gas buffer storage tank into the air intake section, and wherein the gas buffer storage tank is connected in each case via at least one valve to the high-pressure fuel storage tank and to the intake section of the gas combustion engine, and a control unit is provided, which is configured to regulate the fuel gas mass flow or fuel gas volume flow from the high-pressure fuel storage tank to the gas buffer storage tank as a function of the pressure within the high-pressure fuel storage tank, including as a function of whether the actual pressure in the high-pressure fuel storage tank is greater than or equal to the set pressure or greater than a defined threshold value which is dimensioned smaller than the set pressure, wherein the control unit is further configured to permit opening of the valve fluidically arranged between the gas buffer storage tank and the intake section only if the pressure in the gas buffer storage tank is higher than the pressure in the intake section and/or the actual pressure in the high-pressure fuel storage tank is lower than or equal to the set pressure of the high-pressure fuel storage tank, wherein the threshold value is dynamic, including dependent on the actual pressure in the gas buffer storage tank and/or on the difference between the actual and set pressure in the high-pressure fuel storage tank.

* * * * *